(12) United States Patent
Koushik et al.

(10) Patent No.: US 12,172,557 B2
(45) Date of Patent: Dec. 24, 2024

(54) VEHICLE SEAT AND METHOD FOR THE MANAGEMENT OF A VEHICLE SEAT

(71) Applicant: Volvo Truck Corporation, Gothenburg (SE)

(72) Inventors: K S Sudeendra Thirtha Koushik, Bangalore (IN); K S Madhuchandra, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 106 days.

(21) Appl. No.: 18/092,993

(22) Filed: Jan. 4, 2023

(65) Prior Publication Data
US 2023/0219469 A1 Jul. 13, 2023

(51) Int. Cl.
*B60N 2/30* (2006.01)
*B60N 2/62* (2006.01)

(52) U.S. Cl.
CPC ......... *B60N 2/3081* (2013.01); *B60N 2/3036* (2013.01); *B60N 2/62* (2013.01)

(58) Field of Classification Search
CPC ...... B60N 2/62; B60N 2/3081; B60N 2/3084; B60N 2/206; B60N 2/838
USPC ............................... 297/61, 112, 283.3, 403
See application file for complete search history.

(56) References Cited

U.S. PATENT DOCUMENTS

| 3,902,755 | A | | 9/1975 | Sirot | |
|---|---|---|---|---|---|
| 5,681,079 | A | * | 10/1997 | Robinson | ................. B60N 2/36 |
| | | | | | 297/378.12 |
| 2004/0017099 | A1 | * | 1/2004 | O'Connor | ............. B60N 2/862 |
| | | | | | 297/61 |
| 2018/0105076 | A1 | | 4/2018 | Dry | |
| 2020/0101867 | A1 | | 4/2020 | Epaud et al. | |

FOREIGN PATENT DOCUMENTS

| DE | 10057450 A1 * | 5/2002 | ............. B60N 2/206 |
|---|---|---|---|
| DE | 102008059997 A1 | 6/2010 | |
| EP | 1400400 A2 | 3/2004 | |
| FR | 2902716 A1 | 12/2007 | |
| GB | 2337925 A | 12/1999 | |
| GB | 2527615 A | 12/2015 | |

OTHER PUBLICATIONS

European Search Report for European Patent Application No. 22150991.2, completed Aug. 2, 2022, 3 pages.

* cited by examiner

*Primary Examiner* — Milton Nelson, Jr.
(74) *Attorney, Agent, or Firm* — Withrow & Terranova, PLLC

(57) ABSTRACT

A vehicle seat extending along a transversal axis, a vertical axis, and a longitudinal axis that comprises a seat base, a backrest pivotably connected to the seat base through a first pivot connection, and a headrest pivotably connected to the backrest through a second pivot connection, the first and second pivot connections being pivotable in opposite direction around the transversal axis of the vehicle seat and the vehicle seat being configured to reach a first position and a second position.

12 Claims, 2 Drawing Sheets

VEHICLE SEAT AND METHOD FOR THE MANAGEMENT OF A VEHICLE SEAT

RELATED APPLICATIONS

The present application claims priority to European Patent Application No. 22150991.2, filed on Jan. 11, 2022, and entitled "VEHICLE SEAT AND METHOD FOR THE MANAGEMENT OF A VEHICLE SEAT," which is incorporated herein by reference in its entirety.

TECHNICAL FIELD

The invention relates to a vehicle seat and a method for the management of a vehicle seat.

The invention can be applied in heavy-duty vehicles, such as trucks, buses and construction equipment.

BACKGROUND

Vehicles include usually front and rear seat assemblies for supporting occupants within the vehicle. Seat assemblies typically include a seat base and a backrest perpendicularly connected to the seat base for supporting the occupant. The backrest is commonly pivotally connected to the seat base by a pivoting mechanism of the backrest between a plurality of inclined positions relative to the seat base. Vehicles also commonly include rear seat assemblies mounted to the floor of the vehicle by a rotating base for allowing the seat assembly to rotate with an angle around 180° about its vertical axis from a forward seating position to a rearward seating position.

Nevertheless, heavy-duty vehicles, such as trucks, cannot comprise seat assemblies having a rotatable base. Indeed, such seat assemblies taking up a lot of space cannot be incorporated in a cab of a truck vehicle having a narrow place.

It remains desirable to provide an optimized and compact multi-positionable seat assembly positionable between forward and rearward seating positions. It remains also desirable to provide a seat assembly quickly and efficiently adjustable between both positions while allowing cost saving.

SUMMARY

The object is achieved by a vehicle seat extending along a transversal axis, a vertical axis and a longitudinal axis characterized in that it comprises:

A seat base,

A backrest pivotably connected to the seat base through a first pivot connection and A headrest pivotably connected to the backrest through a second pivot connection, Said first and second pivot connections being pivotable in opposite direction around the transversal axis of the vehicle seat and said vehicle seat being configured to reach two positions:

1) A first position in which the backrest and the headrest extend along the vertical axis, and the seat base is substantially perpendicular to the backrest and the headrest and
2) A second position in which the backrest extends along the longitudinal axis and lies against the seat base and the headrest extends along the vertical axis and is substantially perpendicular to the backrest.

By the provision of a vehicle seat according to the present invention, the advantage is to offer a high quality seat assembly that is multi-positionable between forward and rearward seating positions. Furthermore, the seat assembly is quickly and efficiently adjustable between both positions while allowing cost saving. Thus, the seat occupants of the front and the rear seats assemblies can have a face-to-face interaction inside the vehicle. In particular in a truck, the seat assemblies may pivot according to the present invention so that the seat assemblies face the bunk usually located behind the vehicle seats. Moreover, contrary to the seat assemblies that rotate at an angle of 180° and that are taken up place, the vehicle seats according to the present invention are compact and may be implemented in a wide range of vehicles such as trucks.

In another embodiment, the vehicle seat comprises a thighrest pivotably connected to the backrest through a third connection mean, said thighrest being configured to reach two positions:

3) A retracted position in which the thighrest is housed in the backrest and
4) An extended position in which the thighrest extends at least in part from a bottom portion of the backrest.

In this embodiment, the extended thighrest comfortably supports the thighs of the seat occupant in the extended position.

In another embodiment, the thighrest extends along the transversal axis of the vehicle seat. In this embodiment, the thighrest having an elongated shape increases the comfort of the seat occupant.

In another embodiment, the thighrest includes a cushion.

In another embodiment, the third connection mean includes a pivot connection, for example a pivot axle, or a push/pull system.

For example, the pivot connection may comprise a pivot axle extending along the transversal axis (i.e. transverse to longitudinal axis and to the vertical axis). For example, the pivot axle may be attached to one end of the thighrest and configured to enable outward rotation. In another example, the pivot axle may be located almost in the middle of the thighrest. For example, the thighrest or the pivot connection may be spring loaded, in order to move (e.g. to rotate) the thighrest from the retracted position toward the extended position when released. For example, a locking mechanism may be configured to hold the thighrest in extended position. In another example, the connection may comprise a push/pull system. The thighrest may slidably move inwardly/outwardly went pushing the thighrest.

In another embodiment, the first and the second pivot connections include a gear wheels mechanism.

In another embodiment, both sides of the backrest have a seat shape. In this embodiment, both sides of the backrest match the back of the seat occupant to be more comfortable.

The object is achieved by a vehicle comprising the vehicle seat according to the present invention.

The object is achieved by a method for the management of a vehicle seat according to any of the preceding claims characterized in that it comprises the following steps:

A. Selecting a vehicle seat position chosen from:

1) A first position in which the backrest and the headrest extend along the vertical axis, and the seat base is substantially perpendicular to the backrest and the headrest and
2) A second position in which the backrest extends along the longitudinal axis and lies against the seat base, and the headrest extends along the vertical axis and is substantially perpendicular to the backrest and B. Managing the vehicle seat to reach the selected position in step A).

By the provision of a method for the management of the vehicle seat according to the present invention, the advantage is to offer an apprehensible method that quickly and efficiently manages the vehicle seat to reach a forward or a rearward seating position.

In another embodiment, the vehicle seat in the first position reaches the second position by following the following sub-steps:
  i. Pivoting the first pivot connection in a first direction until the backrest lies against the seat base and, the headrest and the backrest extend along the longitudinal axis of the vehicle seat,
  ii. Pivoting the second pivot connection mean in a second direction until the backrest extends along the longitudinal axis and lies against the seat base, and the headrest extends along the vertical axis and is substantially perpendicular to the backrest, Said first and second directions being opposed around the transversal axis of the vehicle seat.

In another embodiment, the vehicle seat in the second position reaches the first position by following the following sub-steps:
  a) Pivoting the second pivot connection in a first direction until the backrest lies against the seat base and, the headrest and the backrest extend along the longitudinal axis of the vehicle seat,
  b) Pivoting the first pivot connection in a second direction until the backrest and the headrest extends along the vertical axis, and the seat base is substantially perpendicular to the backrest and the headrest, Said first and second directions being opposed around the transversal axis of the vehicle seat.

In another embodiment, the method further comprises the following steps:
  C. Selecting a thighrest position chosen from:
    3) A retracted position in which the thighrest is housed in the backrest and
    4) An extended position in which the thighrest extends at least in part from a bottom portion of the backrest and
  D. Managing the thighrest to reach the selected position in step A).

In this embodiment, the method permits to increase the comfort of the seat occupant by efficiently and quickly providing a thighrest.

In another embodiment, the thighrest in a retracted position is pulled and/or twisted to reach the extended position.

In another embodiment, the thighrest in an extended position is pushed and/or twisted to reach the retracted position.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.
In the Drawings.

DETAILED DESCRIPTION

Figure 1:
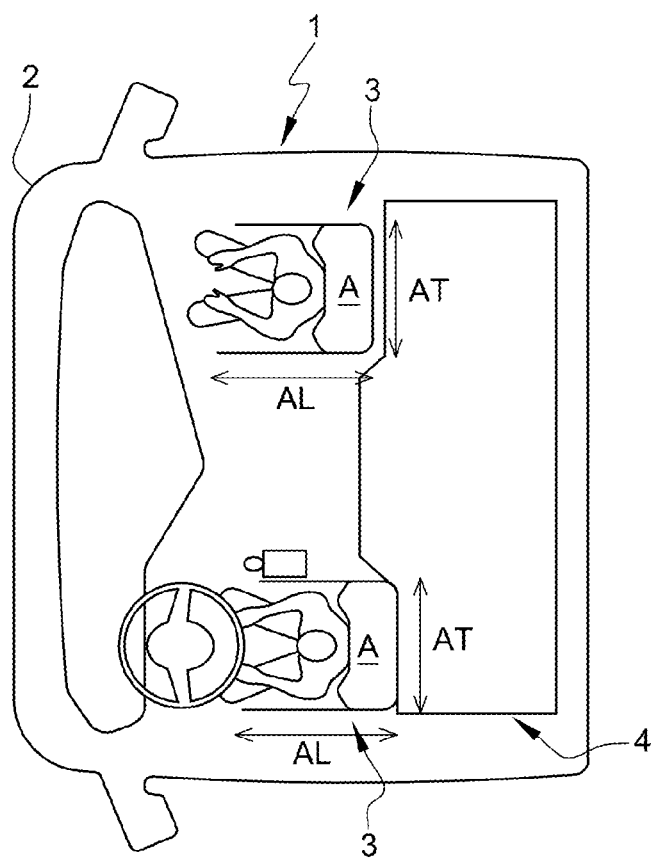
FIG. 1 illustrates a vehicle such as a truck comprising seat assembly in the first position.
Figure 2:
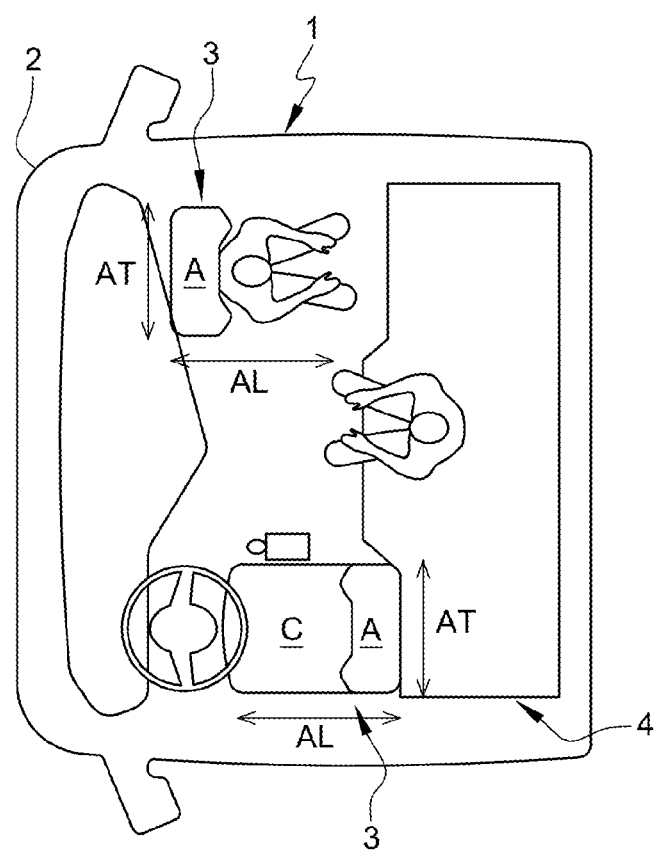
FIG. 2 illustrates a vehicle such as a truck comprising seat assembly in the first position.

FIGS. 1 and 2 illustrate a vehicle 1 comprising a cab 2 including two vehicle seats 3 and a bunk 4. For example, the vehicle 1 is a road vehicle, such as a semi-trailer truck. However, the vehicle 1 can be any industrial vehicle, preferably a wheeled vehicle, such as a tractor, a dump truck, a military vehicle, a heavy-duty construction vehicle such as a loader, a bulldozer, an excavator, a compactor, a scraper or any equivalent vehicle.

As illustrated in FIGS. 1 to 3c, the vehicle seat 3 extends along a transversal axis $A_T$, a vertical axis $A_V$ and a longitudinal axis $A_L$. The vehicle seat 3 comprises a seat base C that may be mounted on a pedestal C' fixely secured on the vehicle floor. The vehicle seat 3 further comprises a backrest B pivotably connected to the seat base C through a first pivot connection 4. For example, both sides of the backrest B have a seat shape configured to receive the back of the seat occupant and match with the back of the seat occupant. The vehicle seat 3 further comprises a headrest A pivotably connected to the backrest B through a second pivot connection 5, said first 4 and second 5 pivot connections being pivotable in opposite direction around the transversal axis $A_T$ of the vehicle seat 3. The first 4 and the second 5 pivot connections may include a gear wheels mechanism.

Figures 3A, 3B, 3C:
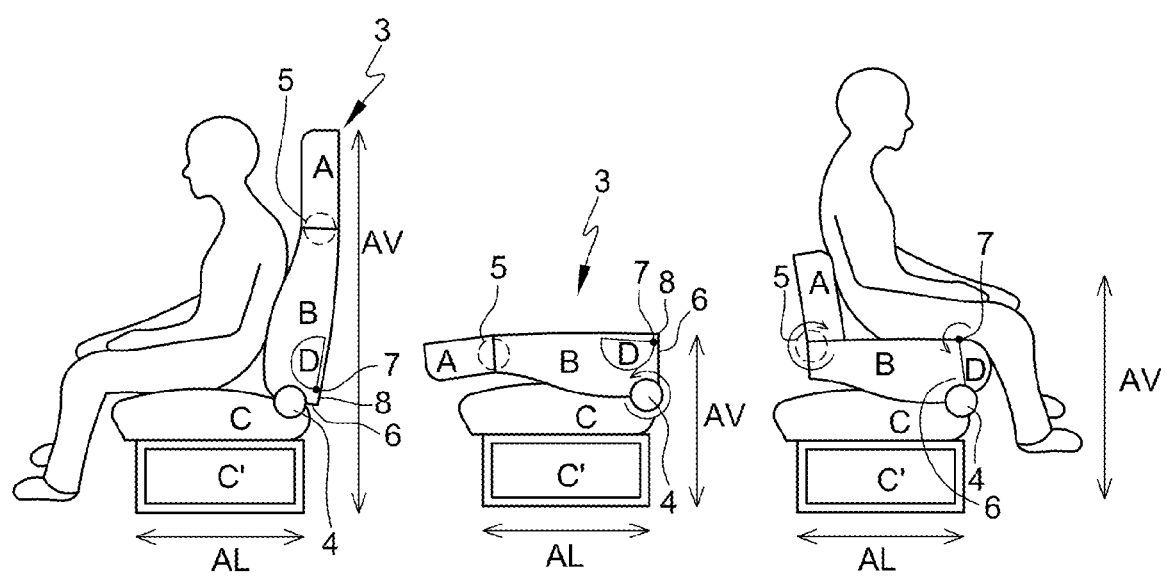
FIG. 3a to FIG. 3c illustrate a method for the management of a vehicle seat.

The vehicle seat 3 is configured to reach a first position and a second position. FIGS. 1 and 3a illustrate the first position in which the backrest B and the headrest A extend along the vertical axis $A_V$, and the seat base C is substantially perpendicular to the backrest B and the headrest A. The first position corresponds to the forward position when the vehicle seat 3 is present in the vehicle 1.

FIGS. 2 and 3c illustrate the second position in which the backrest B extends along the longitudinal axis $A_L$ and lies against the seat base C and the headrest A extends along the vertical axis $A_V$ and is substantially perpendicular to the backrest B. The second position corresponds to the rearward position when the vehicle seat 3 is present in the vehicle 1.

FIGS. 3a and 3c illustrate another embodiment wherein the vehicle seat 3 comprises a thighrest D pivotably connected to the backrest B through a third connection mean (not shown). For example, the third connection mean includes a pivot axle 7. In the present example, the pivot axle 7 is attached to the back lower end 8 of the thighrest, in the first position of the vehicle seat 3, and configured to enable outward rotation (e.g. movement of the thighrest from FIG. 3b to FIG. 3c). In another example not shown, the pivot axle may be located almost in the middle of the thighrest. In still another example not shown, the connection may comprise a push/pull system. The thighrest D can reach two positions: the retracted position in which the thighrest D is housed in the backrest B (FIG. 3a) and an extended position in which the thighrest D extends at least in part outward from a bottom portion 6 of the backrest B (FIG. 3c).

For example, the thighrest D extends along the transversal axis $A_T$ of the vehicle seat 3. In this embodiment, the thighrest D may have an elongated shape increasing the comfort of the seat occupant. For example, the thighrest D includes a cushion.

The method according to the present invention comprises a step A) in which the seat occupant selects a vehicle seat position chosen from the first and the second position. Then, in a step B), the seat occupant manages the vehicle seat 3 to reach the selected position. To this end, the vehicle seat in the first position (FIG. 3a) may reach the second position (FIG. 3c) by, in a step i, pivoting the first pivot connection 4 in a first direction until the backrest B lies against the seat base C and, the headrest A and the backrest B extend along the longitudinal axis $A_L$ of the vehicle seat 3 (FIG. 3b). Then, in step ii, the second pivot connection 5 may pivot in a second direction until the backrest B extends along the longitudinal axis $A_L$ and lies against the seat base C, and the headrest A extends along the vertical axis $A_V$ and is substantially perpendicular to the backrest B (FIG. 3c).

When the vehicle seat 3 is in the second position (FIG. 3c), the seat occupant may reach the first position (FIG. 3a) by, in a step a), pivoting the second pivot connection 5 in a first direction until the backrest B lies against the seat base c and, the headrest A and the backrest B extend along the longitudinal axis $A_L$ of the vehicle seat 3. Then, in a step b), the first pivot connection 4 may pivot in a second direction until the backrest B and the headrest A extends along the vertical axis $A_V$, and the seat base C is substantially perpendicular to the backrest B and the headrest A.

The first and second directions may be opposed around the transversal axis $A_T$ of the vehicle seat.

Preferably, the seat occupant may in a step C) select a thighrest position chosen from the retracted and the extended position and in a step D), manages the thighrest D to reach the selected position. For example, the thighrest D in a retracted position is pulled and/or twisted to reach the extended position. For example, the thighrest D in an extended position is pushed and/or twisted to reach the retracted position. For example, the thighrest or the pivot connection may be spring loaded to assist such movement (s), for example to move the thighrest from the retracted position toward the extended position when released, e.g. moving the vehicle seat from the first position toward the second position.

The optimized vehicle seat and the method for managing such seat according to the present invention is multi-positionable between forward and rearward seating positions. Furthermore, the seat assembly is quickly and efficiently adjustable between both positions while allowing cost saving. Moreover, the vehicle seat according to the present invention is compact and may be implemented in a wide range of vehicles such as trucks.

It is to be understood that the present invention is not limited to the embodiments described above and illustrated in the drawings; rather, the skilled person will recognize that many changes and modifications may be made within the scope of the appended claims.

The invention claimed is:

1. A vehicle seat extending along a transversal axis, a vertical axis, and a longitudinal axis comprising:
 a seat base,
 a backrest pivotably connected to the seat base through a first pivot connection, and
 a headrest pivotably connected to the backrest through a second pivot connection,
 wherein the first and the second pivot connections are pivotable in opposite directions around the transversal axis of the vehicle seat and the vehicle seat is configured to reach two positions:
  a first position in which the backrest and the headrest extend along the vertical axis, and the seat base is substantially perpendicular to the backrest and the headrest, and
  a second position in which the backrest extends along the longitudinal axis and lies against the seat base and the headrest extends along the vertical axis and is substantially perpendicular to the backrest,
 wherein the vehicle seat comprises a thighrest pivotably connected to the backrest through a third connection means, the thighrest being configured to reach two positions:
  a retracted position in which the thighrest is housed in the backrest, and
  an extended position in which the thighrest extends at least in part from a bottom portion of the backrest, and
 wherein the thighrest includes a cushion.

2. The vehicle seat of claim 1, wherein both sides of the backrest have a seat shape.

3. The vehicle seat of claim 1, wherein the thighrest extends along the transversal axis of the vehicle seat.

4. A vehicle comprising the vehicle seat of claim 1.

5. The vehicle seat of claim 1, wherein the third connection means includes a pivot connection or a push pull system.

6. The vehicle seat of claim 1, wherein the first and the second pivot connections include a gear wheels mechanism.

7. A method for the management of the vehicle seat of claim 1, comprising:
 selecting a vehicle seat position chosen from:
  a first position in which the backrest and the headrest extend along the vertical axis, and the seat base is substantially perpendicular to the backrest and the headrest, and
  a second position in which the backrest extends along the longitudinal axis and lies against the seat base, and the headrest extends along the vertical axis and is substantially perpendicular to the backrest, and
 managing the vehicle seat to reach the selected position.

8. The method of claim 7, wherein the vehicle seat in the first position reaches the second position by following the following sub-steps:
 pivoting the first pivot connection in a first direction until the backrest lies against the seat base, and the headrest and the backrest extend along the longitudinal axis of the vehicle seat, and
 pivoting the second pivot connection in a second direction until the backrest extends along the longitudinal axis and lies against the seat base, and the headrest extends along the vertical axis and is substantially perpendicular to the backrest,
 wherein the first and the second directions are opposed around the transversal axis of the vehicle seat.

9. The method of claim 7, wherein the vehicle seat in the second position reaches the first position by following the following sub-steps:
 pivoting the second pivot connection in a first direction until the backrest lies against the seat base, and the headrest and the backrest extend along the longitudinal axis of the vehicle seat, and
 pivoting the first pivot connection in a second direction until the backrest and the headrest extends along the vertical axis, and the seat base is substantially perpendicular to the backrest and the headrest,
 wherein the first and the second directions are opposed around the transversal axis of the vehicle seat.

10. The method of claim 7, wherein the method further comprises:
 selecting a thighrest position chosen from:
  a retracted position in which the thighrest is housed in the backrest, and an extended position in which the thighrest extends at least in part from a bottom portion of the backrest, and managing the thighrest to reach the selected position.

11. The method of claim 10, wherein the thighrest in a retracted position is pulled and/or twisted to reach the extended position.

12. The method of claim 10, wherein the thighrest in an extended position is pushed and/or twisted to reach the retracted position.

* * * * *

UNITED STATES PATENT AND TRADEMARK OFFICE
CERTIFICATE OF CORRECTION

| | | |
|---|---|---|
| PATENT NO. | : 12,172,557 B2 | Page 1 of 1 |
| APPLICATION NO. | : 18/092993 | |
| DATED | : December 24, 2024 | |
| INVENTOR(S) | : K S Sudeendra Thirtha Koushik et al. | |

It is certified that error appears in the above-identified patent and that said Letters Patent is hereby corrected as shown below:

On the Title Page

Add Foreign Application Priority Data, item (30) after item (22):
Jan. 11, 2022 (EP) .......................... 22150991

Signed and Sealed this
Twenty-fifth Day of March, 2025

Coke Morgan Stewart
*Acting Director of the United States Patent and Trademark Office*